July 13, 1965 F. R. SANDOZ 3,195,088
HIGH CURRENT WINDING FOR ELECTRICAL INDUCTIVE APPARATUS
Filed Nov. 23, 1962 2 Sheets-Sheet 1

WITNESSES:
Bernard R. Gregory
David J. Gould

INVENTOR
Frank Rolland Sandoz
BY
F. E. Browder
ATTORNEY

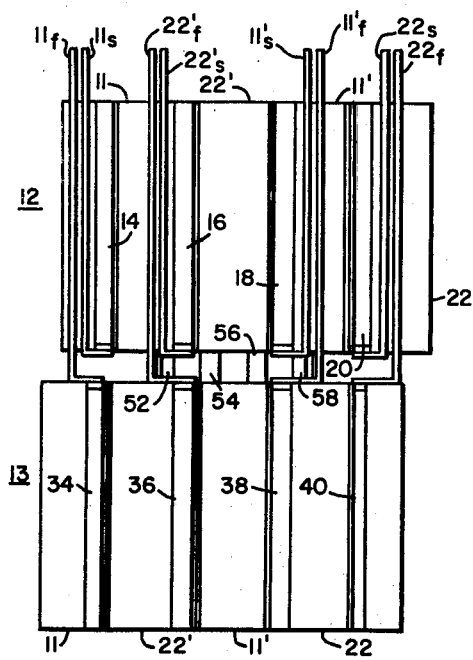
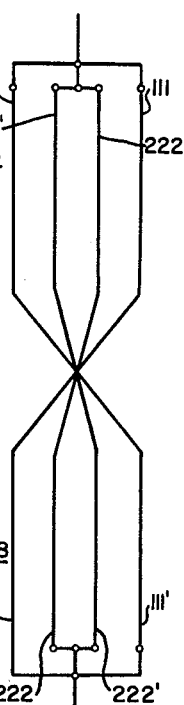
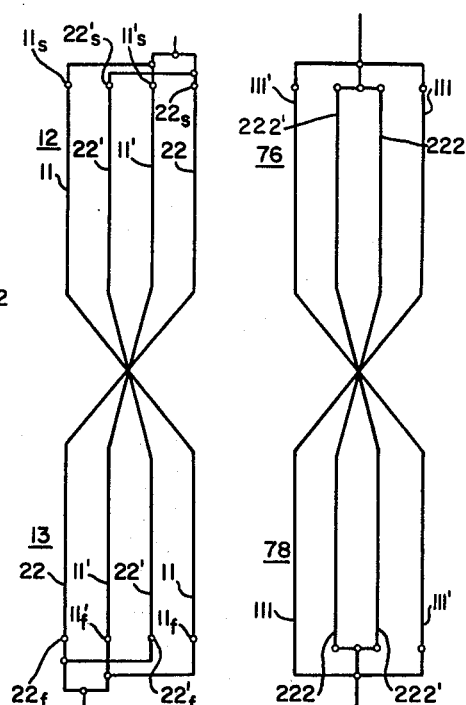
Fig. 5.    Fig. 4.    Fig. 7.
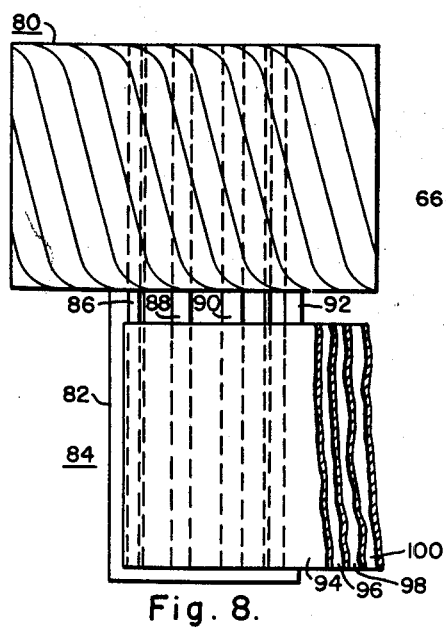
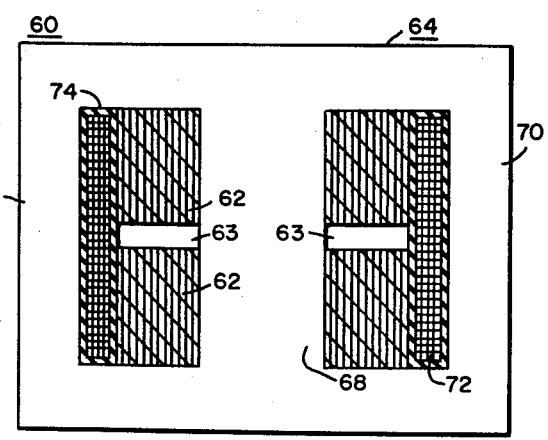
Fig. 6.
Fig. 8.

United States Patent Office 3,195,088
Patented July 13, 1965

3,195,088
HIGH CURRENT WINDING FOR ELECTRICAL INDUCTIVE APPARATUS
Frank Rolland Sandoz, Villeurbanne, Rhone, France, assignor to Le Materiel Electrique S.W., Paris, France, a corporation of France
Filed Nov. 23, 1962, Ser. No. 239,477
Claims priority, application France, Nov. 23, 1961, 879,806, Patent 1,313,959
4 Claims. (Cl. 336—180)

This invention relates in general to stationary electrical inductive apparatus and more particularly to an improved winding of the strap or foil wound type especially adapted for use in high current transformers of the type such as used to supply electrical furnaces or rectifiers.

Transformers such as the type employed to supply electrical furnaces or rectifiers generally are required to deliver high currents at a relatively low voltage. Progress in the rectifier art has led to a demand for transformers capable of delivering higher output currents than ever before.

Accordingly, it is a general object of this invention to provide a new and improved electrical transformer.

It is a more particular object of this invention to provide a new and improved electrical transformer winding for high current applications.

It is a further object of this invention to provide a means of transposing strap or foil wound electrical coils.

Briefly, the present invention accomplishes the above-cited objects by providing a strap or foil wound winding consisting of at least two coils having spiral turns. Alternate coils are spiraled in opposite directions. Each coil is constructed of a plurality of parallel connected strap or foil type conductors separated by electrical insulation and wound together in several courses into a spiral. This subdivision of the winding permits an increase in the current carrying ability of the winding. Electrical connections are made between successive coils so that the parallel circuits through the coils are effectively transposed to reduce eddy current losses.

The interconnections between pairs of coils are made at the inside of the coils in order to have the outside ends of the coil pair available for start and finish connections.

The start and finish connections to each pair of coils are placed on the outside of the coils so as to limit additional losses and stray reactances.

The individual conductors in the coils may be electrically insulated with solid insulation wound up at the same time as the coil conductors or with electrically insulating oil contained in fiber channels. Alternatively, the conductors may be coated with an electrical insulation.

The individual conductors are shifted in a direction parallel to their length in such a manner that the inside and outside connections of each coil are staggered and do not overlap. The parallel paths through the coils are transposed between coils to get a good current distribution in each path. The transposition between coils is aided by the reversal of the direction of the spirals in alternate coils. For example, if the inside ends of the coil conductors in alternate coils are so aligned and connected that the innermost conductor of the first course of a clockwise wound coil is attached to the outermost conductor of the first course of a counterclockwise wound coil, the series electrical circuit through the coils by means of these conductors will be transposed between coils in relation to the other parallel conductors in the coils. The other conductors are similarly transposed between coils.

If greater current carrying capacity is required, the winding may be subdivided still further. This transposition results in each parallel path having substantially the same resistance and leakage reactance with respect to the primary winding of the transformer. The transposition also results in a low mutual leakage reactance between parallel paths of the secondary coils described above.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which:

FIG. 4 is a schematic diagram of one mode of transposition which may be used between coils;

FIG. 5 is a side elevation of the coils of FIG. 1 showing the start and finish connections of the winding;

FIG. 6 is a cross section of a transformer having a secondary winding employing the teachings of the invention;

FIG. 7 is a schematic diagram of the start and finish connections to the winding of FIG. 5; and FIG. 8 is a rear elevation of the winding of FIG. 5 with parts broken away showing how the connections between coils are made.

Figure 1:
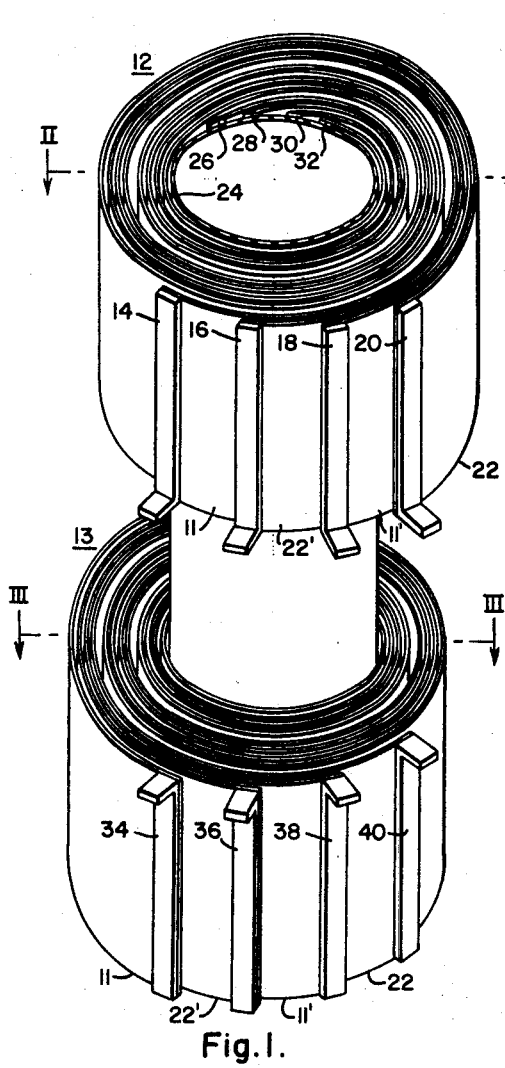
FIGURE 1 shows an exploded perspective view of two transformer coils embodying the teachings of the invention.

Referring to FIG. 1 of the drawings there is illustrated an exploded view of a transformer high current winding comprising two superposed coils 12 and 13 wound on a mandrel or tube 24.

The coil 12 is wound of four strap or foil conductors 11, 22', 11' and 22. The four conductors are wound together in a series of courses into a roughly cylindrical configuration. It will be understood that a course will be taken to mean a layer of conductors connected in electrical parallel. On the outside of coil 12 the ends of the foil or strap windings are staggered and are attached to terminal members 14, 16, 18 and 20 by some means such as brazing or welding. On the inside of coil 12 the ends of the strap or foil conductors 11, 22', 11' and 22 are also staggered and are attached to metal terminal strips 26, 28, 30 and 32. Proceeding from the inside of coil 12 to the outside, it will be observed that the windings are wound in a clockwise direction.

Coil 13 of FIG. 1 is also wound of foil or strap conductors 11, 22', 11' and 22. The coil 13 is joined to coil 12 to form a complete high current winding. On the outside of coil 13 the strap or foil windings comprising coil 13 are terminated in a staggered manner and connected to terminals 34, 36, 38 and 40. The inside ends of the strap or foil conductors forming coil 13 are also staggered and are so positioned as to lie substantially directly below the corresponding inside terminals of coil 12. Coil 13 is wound in a counterclockwise direction from the inside of the coil to the outside.

Figure 2:
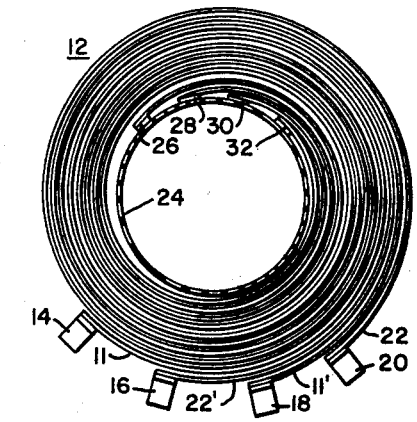
FIG. 2 is a sectional view through section II—II of FIG. 1.

In FIG. 2 of the drawings there is shown a cross sectional view of the coil 12 of FIG. 1 taken at section II—II. In this view it is clearly seen how the first half of the four strap or foil windings 11, 22', 11' and 22 are staggered at both the inside and outside ends of the coil so that inside terminals 26, 28, 30 and 32 and outside terminals 14, 16, 18 and 20 are spaced apart to make room for interconnections between the coils which will be described in detail later. This staggering of conductor ends prevents overlapping of terminals which would have an adverse effect on the space factor and also present an insulation problem.

Figure 3:
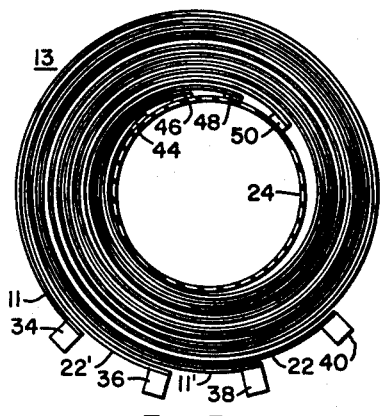
FIG. 3 is a sectional view through section III—III of FIG. 1.

Referring to FIG. 3 of the drawings there is shown a sectional view of the coil 13 of FIG. 1 taken at plane III—III.

From this view it is seen that the second half of the four strap or foil windings 11, 22′, 11′ and 22 spiral in a counterclockwise direction from the inner terminals 44, 46, 48 and 50 to the outer terminals 34, 36, 38 and 40. The inner terminals 44, 46, 48 and 50 of coil 13 are connected to the inner terminals 26, 28, 30 and 32 of coil 12 of FIG. 2 by means which will be discussed later.

In FIG. 5 of the drawings there is illustrated one way in which start and finish connections may be attached to the coils 12 and 13 of FIG. 1. A starting lead $11_s$ is attached to terminal 14 of conductor 11 in coil 12. In like manner, starting leads $22'_s$, $11'_s$ and $22_s$ are connected to terminals 16, 18 and 20 of conductors 22′, 11′ and 22 respectively. A finish lead $11_f$ is connected to terminal 34 of conductor 11 in coil 13. In like manner, finish leads $22'_f$, $11'_f$ and $22_f$ are attached to terminals 36, 38 and 40 of conductors 22′, 11′ and 22 respectively. The coils 12 and 13 are connected in electrical series by means of the straps 52, 54, 56 and 58 located at the interior of the coils. Four parallel circuits may now be traced through coil 12, to coil 13 and through coil 13 to the finish terminals. For example, circuit 11 enters the winding at the start lead $11_s$ and spirals inward through coil 12 from terminal 14 in a counterclockwise direction to strap 58 where it connects to coil 13. In coil 13 conductor 11 spirals outward from strap 58 in a counterclockwise direction to terminal 34 where it is joined to the finish lead $11_f$.

In like manner, circuit 22′ may be traced from starting lead $22'_s$ through conductor 22′ in both coils as connected by strap 56 and through terminal 36 of coil 13 to the finish terminal $22'_f$.

The 11′ circuit of the winding starts at the start terminal $11'_s$, spirals inward in a counterclockwise direction through coil 12, is joined to coil 13 by strap 54 and then spirals outward through coil 13 in a counterclockwise manner to terminal 38 where it is connected to the finish terminal $11'_f$.

The fourth parallel circuit in the winding enters the winding at the start terminal $22_s$, is connected to conductor 22 by terminal 20 of coil 12, spirals inward in a counterclockwise direction through coil 12, connects to conductor 22 of coil 13 at the inside of coil 13 by means of strap 52, spirals outward through coil 13 in a counterclockwise direction to terminal 40 where it is connected to the finish lead $22_f$. FIG. 4 thus shows how the two halves of the winding are joined to give four paths in parallel through the two halves of the winding connected in series.

In FIG. 4 there is illustrated a schematic diagram of the winding shown in FIG. 5. At the top of the figure are the four starting leads $22_s$, $11'_s$, $22'_s$ and $11_s$. At the bottom of the figure are the finishing terminals $11_f$, $22'_f$ $11'_f$ and $22_f$. It will be noted that there has been an effective transposition of the winding between coils 12 and 13, for example, assuming the center of the winding to lie to the left of FIG. 4, conductor 11 starts off in coil 12 at the inside of the other four conductors and finishes in coil 13 at the outside of the other four conductors. Likewise, circuit 22 will be the outermost conductor in coil 12 but will be the innermost conductor in coil 13. It will be observed that each of the two branches of the winding are divided into two separate conductors, for example, circuits 22 and 22′ are the divisions of one branch of the winding and circuits 11′ and 11 are divisions of the other branch of the winding. It will also be noted that the divisions of each branch of the winding are separated by a division of another branch of the circuit, for example, the divisions 22 and 22′ of one branch of the winding are separated by division 11′ of the other branch of the winding.

This winding is well suited for use as the high current winding of a rectifier transformer connected in double star with an interphase because the two branches of the winding are rigorously identical making the two stars perfectly parallel. Each branch has the same resistance and the same leakage reactance with respect to the primary of a transformer employing the winding of FIG. 4 as a secondary winding. The mutual leakage reactance on the other hand is as small as possible.

Conductors 11 and 22 are perfectly transposed as are conductors 11′ and 22′. Conductors 11 and 11′ as well as conductors 22 and 22′ while not perfectly transposed have very near the same reactances relative to a high voltage winding when the winding of FIG. 4 is used as the low voltage winding of a transformer.

FIG. 6 is a transverse sectional view of a transformer 60 using the winding 62 disclosed in the invention as its low voltage or secondary winding. The transformer 60 is composed of a laminated magnetic core 64 having three legs 66, 68 and 70; about the center leg 68 is wound the two part high current winding 62 of the invention. Over this high current winding 62 is disposed a high voltage or primary winding 72. The high voltage winding 72 is shown as a well known wire wound winding, however, it will be understood that the high voltage winding 72 may also be wound of strap or foil conductors. Electric insulation 74 is used to separate the high voltage winding 72 from the low voltage winding 62 and to insulate the high voltage winding from the laminated magnetic core 64. The void 63 between the two parts of high current winding 62 may be used to circulate a cooling medium.

FIG. 7 is a schematic diagram of another mode of interconnection of the conductors of two coils 76 and 78 constructed in accordance with the teachings of the invention. In this winding, unlike the winding illustrated by FIG. 4, the divisions of each branch of the winding are not separated by a division of another branch of the circuit, for example, divisions 222 and 222′ of one branch are adjacent in both coil 76 and coil 78. However, it will be noted that each branch of the circuit is perfectly transposed. For example, the branch of the winding divided into divisions 111 and 111′ occupies the same flux linkages in coil 78 as it does in coil 76. Likewise, the branch of the winding comprising conductors 222 and 222′ will have the same flux linkages in coil 78 as in coil 76. This mode of interconnecting the coils is adapted for use in supplying a rectifier in bridge connection.

Referring to FIG. 8 of the drawings, there is illustrated a manner in which the inside connections between adjacent coils of the invention may be made. A coil 80 is shown wound on a tube 82 and the start of a second coil 84 is illustrated. Each strip of metal conductor constituting a conductor of coil 80 is joined to a corresponding metal strip in coil 84 by thin metal straps 86, 88, 90 and 92 which may be of uniform width. Before the start of the winding operation of the first coil 80, metal foils or straps such as straps 86, 88, 90 and 92 are attached to each of the conductors of coil 80. Then, coil 80 is wound up, next the metal straps 86, 88, 90 and 92 of coil 80, are joined by a method such as brazing or soldering to the conductors 94, 96, 98 and 100 which will be wound up to form coil 84. Coil 84 is then wound in a direction opposite to the way coil 80 was wound.

It will, therefore, be apparent that there has been disclosed a high current foil or strap winding for electrical transformers which has several parallel connected transposed branches.

It will be understood that while for simplicity only single phase operation of the invention has been treated in detail, the invention is equally applicable to multi-phase operation.

Since numerous changes may be made in the above-described apparatus and different embodiments may be made without departing from the spirit thereof, it is intended that all the matter contained in the foregoing description or shown in the accompanying drawings

I claim as my invention:

1. A winding for electrical inductive apparatus including at least two superposed coils, each of said coils comprising a plurality of spiral shaped sheet conductors of metal separated by electrical insulating material, the direction of the conductor spirals alternating in successive coils between a clockwise and a counterclockwise direction, the ends of said conductors being staggered at both the inside and the outside ends of said coils, said coils being aligned with one another with the inside ends of the conductors of one coil being disposed substantially opposite the inside ends of the conductors of an adjacent coil, electrical conductor means joining said oppositely disposed inside ends of said adjacent coils to form a plurality of series connected conductors, means electrically connecting certain of the outside ends of said series connected conductors to form a plurality of parallel circuits through said coils, said winding being adapted for connection to an external circuit by terminal means attached to the outside ends of the first and last coils.

2. A winding for electrical inductive apparatus comprising; a plurality of superposed coils, each of said coils including a plurality of spiraled sheet conductors of metal electrically insulated from each other, said sheet conductors in adjacent coils being spiraled in opposite directions about a common axis, the ends of said conductors at both the inside and outside of each coil being staggered to separate the terminations of the several conductors, said coils being disposed with the inside ends of the conductors of one coil opposite the inside ends of the conductors of an adjacent coil, electrical conductor means joining oppositely disposed inside ends of adjacent coils to form a plurality of series connected conductors that occupy symmetrically opposite positions in adjacent coils, means electrically connecting certain of the outside ends of said series connected conductors to form a plurality of parallel circuits through said coils in which the branches of one parallel circuit are separated by the branches of another parallel circuit.

3. A winding for electrical inductive apparatus especially adapted for high current use including at least two superposed coils having a common axis, each of said coils comprising at least four relatively thin metallic sheet conductors separated by electrical insulation, said conductors being spiraled together to form a plurality of turns having inside and outside ends, the direction of the spiral being clockwise in one coil and counterclockwise in the adjacent coil, the inside and outside ends of said conductors being staggered to separate the terminations of the conductors, said coils being disposed with the inside ends of the conductors of one coil opposite the inside ends of the conductors of an adjacent coil, electrical conductor means joining oppositely disposed inside ends of adjacent coils to form a plurality of series connected conductors that occupy symmetrically opposite positions in adjacent coils, said coils having means attached to the outside ends of said conductors for making suitable electrical connections to an external circuit and forming at least two parallel circuits each comprising at least two parallel branches, said parallel circuits being connected so that one circuit is separated by both the branches of the other parallel circuit.

4. An electrical transformer including at least one low current winding of any suitable design, said low current winding being inductively coupled to at least one high current winding comprising a plurality of coils, each of said coils having a plurality of metal conductors in sheet form separated by electrical insulation, said conductors being wound together to form a plurality of turns having inside and outside ends, said coils being wound in opposite directions in successive coils, the inside and outside ends of said conductors being staggered to separate the terminations of said conductors and provide terminations which have an adjacent turn on only one side thereof, said coils being disposed with the inside ends of the conductors of one coil opposite the inside ends of the conductors of an adjacent coil, conductor means joining oppositely disposed inside ends of adjacent coils to form a plurality of series connected conductors whose positions are transposed in adjacent coils, conductor means connected to certain of the outside ends of said series connected conductors to provide a plurality of parallel circuits each having a plurality of branches through said high current winding.

References Cited by the Examiner

UNITED STATES PATENTS

| | | | |
|---|---|---|---|
| 2,228,093 | 1/41 | Sauer | 336—188 |
| 2,260,296 | 10/41 | Christopher et al. | 336—223 X |
| 2,866,955 | 12/58 | Mess et al. | 336—223 X |
| 2,980,874 | 4/61 | Tarbox | 336—223 X |
| 3,068,433 | 12/62 | Wroblewski | 336—223 X |

FOREIGN PATENTS 210,648  5/56  Australia.

LARAMIE E. ASKIN, *Primary Examiner.*

JOHN F. BURNS, *Examiner.*